PRECISION MINIATURE SEXLESS COAXIAL CONNECTOR

Original Filed Dec. 16, 1968

INVENTOR
HARMON W. BANNING
BY
Wolf, Greenfield & Sacks

United States Patent Office

Re. 27,483
Reissued Sept. 19, 1972

27,483

PRECISION MINIATURE SEXLESS COAXIAL CONNECTOR

Harmon W. Banning, Winchester, Mass., assignor to Andrew Alford, Winchester, Mass.

Original No. 3,533,046, dated Oct. 6, 1970, Ser. No. 783,941, Dec. 16, 1968. Application for reissue May 26, 1971, Ser. No. 147,066
Int. Cl. H01r *17/04, 25/00*
U.S. Cl. 339—48 6 Claims

Matter enclosed in heavy brackets [ ] appears in the original patent but forms no part of this reissue specification; matter printed in italics indicates the additions made by reissue.

ABSTRACT OF THE DISCLOSURE

A miniature sexless coaxial connector is characterized by an inner conductor sliding spring mechanism to establish coupling between like connectors while introducing negligible mismatch.

BACKGROUND OF THE INVENTION

The present invention relates to precision sexless miniature connectors and more particularly concerns a novel miniature coaxial connector suitable for use with 3.5 millimeter lines while introducing negligible mismatch or unwanted resonances.

The use of a spring-loaded inner conductor for a precision coaxial sexless connector is not in and of itself new. There exists such a connector for use in 7 mm. coaxial lines. However, practical difficulties are encountered when merely scaling down this connector to the 3.5 mm. size.

Accordingly it is an important object of this invention to provide a precision sexless coaxial connector suitable for use with 3.5 mm. lines that is reliable, relatively easy and inexpensive to fabricate and exhibits excellent electrical properties over a wide bandwidth.

It is a further object of the invention to achieve the preceding object while introducing relatively little mismatch over a wide range of frequencies.

SUMMARY OF THE INVENTION

According to the invention, there are means defining an outer conductor and an inner conductor assembly having an inside portion maintained in fixed relationship with respect to the other conductor means and an outside portion that is axially slideable and radially fixed relative to the axis of the connector. The inner conductor assembly includes spring means in a region around an outside stud that is inside the circularly cylindrical cavity at the inside end of the inner conductor outside portion. The bottom of this cavity is defined by an annular shoulder or base formed with an opening of diameter slightly larger than the diameter of the stud, but slightly less than the diameter of a screwhead. The stud is internally tapped to accommodate a screw having that screwhead so that the screwhead coacts with the base to limit the outward movement of the outside portion as the surrounding spring urges the inside and outside portions apart to insure good contact with the inner conductor of a like sexless coaxial connector. The inside portion also includes a beveled shoulder upon which the inside surface of the outside portion rides.

Numerous other objects, advantages and features of the invention will become apparent from the following specification when read in connection with the accompanying drawing in which:

DETAILED DESCRIPTION OF PREFERRED EMBODIMENTS

Figure 1:
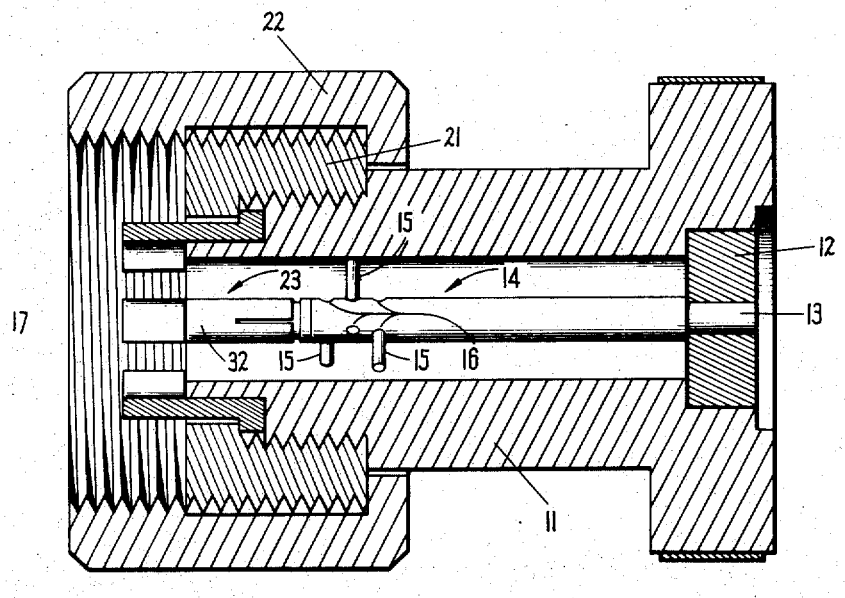
FIG. 1 is a longitudinal sectional view through a con nector according to the invention.

With reference now to the drawing and more particular ly FIG. 1 thereof, there is shown a sectional view throug a connector according to the invention. The outer con ductor assembly includes a main [conducting] *con ductive* portion 11 [that carries an annular dielectri bead 12 in the inside end of the connector surroundin an inner conductor inside ] *which serves as the oute conductor of a coaxial line. The portion 11 is preferabl a cylinder having extending through it a central longi tudinal aperture 10. Adjacent one end of the cylinde and situated in the central aperture is an annular dielectri bead 12. The insulative bead supports the end portion 1 of inner conductor 14 to maintain the inner conducto coaxial with the outer conductor 11. The* end portio 13 *is* of slightly smaller diameter than the main lengt of the inner conductor so that the characteristic impedanc of the connector along the entire length is substantiall constant. The inner conductor assembly includes a fixe inside portion 14 that is supported by three [radial] *insulator* pins 15 *which extend radially and are* equiangu larly disposed about the connector axis between com pensating pairs of holes, such as 16. *Where inner con ductor 14 is relatively short, the support provided by th bead 12 is sufficient to hold the inner conductor 14 i rigid concentric relationship with cylinder 11 and the in sulator pins need not then be employed.* The outer con ductor assembly also [carries] *includes* a crenelated align ment ring 17 [at its outside end that is held in place] *which protrudes beyond the cylinder 11 and is held in en gagement with the cylinder* by the internally and external ly threaded collar 21. An internally threaded coupling nu 22 completes the outer conductor assembly.

The inner conductor [assembly] *14* includes [ a move able outside portion] *an assembly* 23 *having a moveabl cylindrical sleeve* that is slideable along the axis of th connector but maintained in precise concentric relation ship with respect to the outer conductor.

Figure 2:
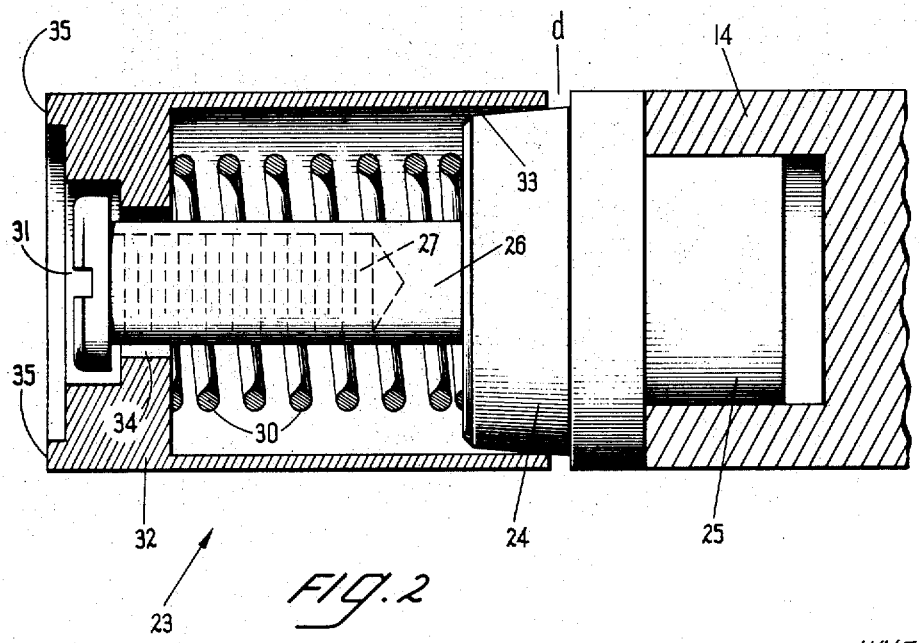
FIG. 2 is a sectional view through the inner conducto assembly according to the invention.

Referring to FIG. 2 there is shown a detailed magnifie longitudinal sectional view of the inner conductor as sembly near the outside end of the connector helpful i understanding the invention. The unitary circularly cylin drically symmetrical conducting part 24 is formed wit an outside stud 25 that fits snugly within the hollow en of [assembly] *conductor* 14 in fixed relationship thereto *That is, stud 25 is held to conductor 14 by any suitabl means to prevent the disengagement of those member* [Its outside end] *The protruding end of part 24* i formed with a stud 26 having a threaded opening 27 fo accommodating a screw 31. A hollow conducting [cylin der] *cylindrical sleeve* 32, urged away from conductin member 24 by spring 30 and limited in axial end trave by the head of screw 31, completes the inner conducto assembly. *The sleeve 32 is, in effect, an extension of con ductor 14.* A feature of the invention resides in formin the shoulder 33 of member 24 upon which the inside wal of member 32 slides slightly bevelled as shown to hel reduce electrical mismatch. Member 32 is formed with central opening 34 of diameter slightly greater than tha of outside stud 27 and less than the diameter of the hea of screw 31 and the daimeter of spring 30. Actual con tact with the inner conductor of a like mating connecto occurs along the annular outer surface 35 as the sprin urges member 32 against a like member to insure good iable contact.

Referring again to FIG. 1, actual connection occurs by ding back the coupling nut 22 on one connector and ewing the coupling nut of the other connector around e outside threads of member 21 [as the crenelated alignent rings and the two connector interleave and engage e another]. *The crenelated rings engage and interleave align the two connectors and the spring biased center nductor sleeves 32 are pressed together, end to end, in utting engagement to provide good electrical continuity r the inner conductor.* The specific crenelated ring and upling nut assembly is known in the art and *is* not a rt of this invention.

The invention is relatively easy and inexpensive to fabrite. The member 24 may be accurately formed. Assembly relatively easy to accomplish by putting spring 30 over id 26, sliding member 32 over member 24, and screwg screw 31 into threaded opening 27.

There has been described a novel connector assembly at represents a practical high performance 3.5 mm. sexs coaxial connector. It is evident that those skilled in the may now make numerous uses and modifications of d departures from the specific embodiment described rein without departing from the inventive concepts. onsequently, the invention is to be construed as embracg each and every novel feature and novel combination features present in or possessed by the apparatus and chniques herein disclosed and limited solely by the spirit d scope of the appended claims.

The bevelling of shoulder 33 performs a dual function. provides a means for effecting good contact with the inle wall of hollow conducting cylinder 32 over a range relative axial displacement. It also increases slightly e effective diameter of the outer surface of cylinder 32 his cylinder having four longitudinal slots in space adrature to permit some expansion) to introduce an ective capacity that compensates for the inductive effect the gap *d* immediately adjacent to the cyinlder open end d of the slots.

The slight difference between the diameter of opening and stud 26 allows a slight axial misalignment of inner nductors of mating connectors to insure a good conction with good electrical characteristics despite slight echanical imperfections.

What is claimed is:

1. A precision miniature coaxial sexless connector comising:

[means defining an] *a cylindrical* outer [conducting surface] *coaxial conductor* [having an inside axis], *an inner conductor axially disposed along the center of the cylindrical outer conductor,* an inner conductor assembly disposed inside [said means defining an] *the cylindrical* outer conductor *and in alignment with the inner conductor,* said inner conductor assembly including *a cylindrical conducting part having means at one end fixed to the inner conductor, said conducting part having a* [an outside] stud of first diameter contiguous with a shoulder of second diameter greater than said first diameter [and formed with], *said stud having* an internally threaded opening for receiving a screw.

a hollow *cylindrical* conducting element open at one end *and* having its inside wall axially slideable along said shoulder, [and] *said element* having a base at the other end formed with an opening of third diameter slightly larger than said first diameter,

[spring] *resilient* means in the region between said shoulder and said base urging said shoulder and said base apart, and a screw in said threaded opening having a head of fourth diameter slightly greater than said third diameter for limiting the axial displacement of said base [.] ,

*said base including a terminal annulus within which the entire head of the screw is recessed.*

2. A precision miniature coaxial sexless connector in accordance with claim 1 wherein said shoulder is slightly bevelled.

3. A precision miniature coaxial sexless connector in accordance with claim 1 wherein said [spring] *resilient* means is a helical spring surrounding said [outside] stud and of fifth diameter greater than said third diameter and less than said second diameter.

4. A precision miniature coaxial sexless connector in accordance with claim 2 wherein said [spring] *resilient* means is a helical spring surrounding said [outside] stud and of fifth diameter greater than said third diameter and less than said second diameter.

5. A precision miniature coaxial sexless connector in accordance with claim 1 wherein said [outside] stud and said shoulder comprise a unitary structure.

6. A precision miniature coaxial sexless connector in accordance with claim 5 wherein said unitary structure [comprise] *includes* an inside stud at its inside end *which is received within the inner conductor.*

References Cited

The following references, cited by the Examiner, are of record in the patented file of this patent or the original patent.

UNITED STATES PATENTS

| | | | |
|---|---|---|---|
| 2,117,029 | 5/1938 | Larsson | 339—48 |
| 2,690,542 | 9/1954 | Pearce et al. | 339—48 |

FOREIGN PATENTS

| | | | |
|---|---|---|---|
| 878,865 | 10/1961 | Great Britain | 339—177 R |

MARVIN A. CHAMPION, Primary Examiner

L. J. STAAB, Assistant Examiner

U.S. Cl. X.R.

339—89 C, 177 R